(12) United States Patent
Yamasaki (10) Patent No.: US 10,340,765 B2
(45) Date of Patent: Jul. 2, 2019

(54) DRIVE APPARATUS HAVING MOTOR UNIT RECEIVED IN MOTOR CASE

(71) Applicant: DENSO CORPORATION, Kariya, Aichi-pref. (JP)

(72) Inventor: Masashi Yamasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/195,637

(22) Filed: Jun. 28, 2016

(65) Prior Publication Data

US 2017/0005539 A1 Jan. 5, 2017

(30) Foreign Application Priority Data

Jul. 1, 2015 (JP) .................................. 2015-132342

(51) Int. Cl.
| | |
|---|---|
| *H02K 5/10* | (2006.01) |
| *H02K 5/02* | (2006.01) |
| *H02K 5/04* | (2006.01) |
| *H02K 11/00* | (2016.01) |
| *H02K 11/33* | (2016.01) |

(52) U.S. Cl.
CPC .................. *H02K 5/10* (2013.01); *H02K 5/02* (2013.01); *H02K 5/04* (2013.01); *H02K 11/33* (2016.01); *H02K 2203/03* (2013.01)

(58) Field of Classification Search
CPC .......... H02K 5/132; H02K 5/22; H02K 5/225; H02K 5/10; H02K 5/12
USPC .................................. 310/86–89, 68 A–68 R
See application file for complete search history.

(56) References Cited

U.S. PATENT DOCUMENTS

| | | | | | |
|---|---|---|---|---|---|
| 4,532,446 | A | * | 7/1985 | Yamamoto | ........... H02K 5/1285 220/612 |
| 4,684,837 | A | * | 8/1987 | Schaefer | ................ H02K 1/185 310/87 |
| 2002/0041812 | A1 | * | 4/2002 | Yokomachi | ......... F04B 27/1036 417/269 |

(Continued)

FOREIGN PATENT DOCUMENTS

| | | | | |
|---|---|---|---|---|
| JP | S64-030659 | | 2/1989 | |
| JP | 08156608 | A * | 6/1996 | ............. B62M 6/55 |

(Continued)

OTHER PUBLICATIONS

Machine Translation, Namihana, JP-2005027366-A, Jan. 2005. (Year: 2005).*

*Primary Examiner* — Thomas Truong
(74) *Attorney, Agent, or Firm* — Knobbe, Martens, Olson & Bear, LLP (57) ABSTRACT

A motor unit is received in a first space of a motor case. A frame contacts an inner peripheral wall of the motor case and is fixed in an inside of the motor case. A cutout, which is formed in at least one of the motor case and the frame, forms a seal groove, which extends in a circumferential direction between the motor case and the frame. A cover covers the seal groove and forms a second space in an inside of the cover. A seal material is received in the seal groove and limits intrusion of liquid, such as water, from an outside of the motor case and the cover into the first space and the second space. In this way, intrusion of the liquid into the first space and the second space can be limited with the seal material provided in the single seal groove.

17 Claims, 9 Drawing Sheets

(56) References Cited

U.S. PATENT DOCUMENTS

| | | | |
|---|---|---|---|
| 2002/0117914 A1 | 8/2002 | Doi et al. | |
| 2004/0145259 A1* | 7/2004 | Wysk | H02K 5/10 310/89 |
| 2005/0254975 A1* | 11/2005 | Kinmartin | B60H 1/00471 417/423.14 |
| 2009/0155101 A1* | 6/2009 | Fukasaku | F04C 18/0215 417/410.1 |
| 2011/0091337 A1 | 4/2011 | Suzuki et al. | |
| 2011/0254393 A1* | 10/2011 | Yamasaki | H02K 5/18 310/64 |
| 2013/0320792 A1* | 12/2013 | Fukasaku | H02K 5/22 310/89 |
| 2015/0069862 A1* | 3/2015 | Bulatow | H02K 5/04 310/43 |

FOREIGN PATENT DOCUMENTS

| | | | | |
|---|---|---|---|---|
| JP | H08-205457 | | 8/1996 | |
| JP | 09215252 A | * | 8/1997 | ............ B29C 65/48 |
| JP | 2002-115654 | | 4/2002 | |
| JP | 2002-252958 | | 9/2002 | |
| JP | 2005-027366 | | 1/2005 | |
| JP | 2005027366 A | * | 1/2005 | |

* cited by examiner

RELATED ART

DRIVE APPARATUS HAVING MOTOR UNIT RECEIVED IN MOTOR CASE

CROSS REFERENCE TO RELATED APPLICATION

This application is based on and incorporates herein by reference Japanese Patent Application No. 2015-132342 filed on Jul. 1, 2015.

TECHNICAL FIELD

The present disclosure relates to a drive apparatus.

BACKGROUND

Previously, there is known a drive apparatus that includes a motor unit and a control device for controlling the motor unit.

For instance, the drive apparatus of JP5260198B2 (corresponding to US2011/0091337A1) includes an inverter accommodating housing, which is shaped into a generally box form and is formed as a portion of a motor housing. The inverter accommodating housing has a groove that extends all around an opening of the inverter accommodating housing in an opening side end surface of the inverter accommodating housing. A seal material is filled in the groove of the inverter accommodating housing, and a cover is placed over the groove. In this way, the drive apparatus can limit intrusion of, for example, water from an outside of the inverter accommodating housing and the cover into an inside of the inverter accommodating housing and the cover.

However, in the drive apparatus of JP5260198B2 (corresponding to US2011/0091337A1), the inverter accommodating housing has a relatively large wall thickness that includes a width of the groove, a width of an inner peripheral wall, which is located on a radially inner side of the groove, and a width of an outer peripheral wall, which is located on a radially outer side of the groove. Therefore, a size of this drive apparatus may possibly become large.

Furthermore, in the drive apparatus of JP5260198B2 (corresponding to US2011/0091337A1), the inner peripheral wall and the outer peripheral wall are provided at the radially inner side and the radially outer side, respectively, of the groove in the opening side end surface of the inverter accommodating housing. Therefore, the manufacturing steps at the time of forming the groove may possibly become complicated.

SUMMARY

The present disclosure is made in view of the above disadvantages.

According to the present disclosure, there is provided a drive apparatus that includes a motor unit, a motor case, a frame, at least one cutout, a cover and a seal material. The motor case is shaped into a tubular form and has a first space, which receives the motor unit. The frame contacts an inner peripheral wall of the motor case at a contact location and is fixed to an inside of the motor case. The at least one cutout is formed in at least one of the inner peripheral wall of the motor case and an outer peripheral wall of the frame and is located on an opposite side of the contact location, which is opposite from the first space. The at least one cutout forms a seal groove, which is located between the motor case and the frame and extends in a circumferential direction. The cover covers the seal groove and forms a second space on an opposite side of the frame, which is opposite from the first space. The seal material is received in the seal groove.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings. In the following embodiments, similar components will be indicated by the same reference numerals and will not be described redundantly for the sake of simplicity.

(First Embodiment)

FIGS. 1 to 4 show a first embodiment of the present disclosure. A drive apparatus 1 of the first embodiment is used in an electric power steering apparatus of, for example, a vehicle (e.g., an automobile) and generates a steering assist torque, which assists a steering operation of a driver of the vehicle.

Figure 1:
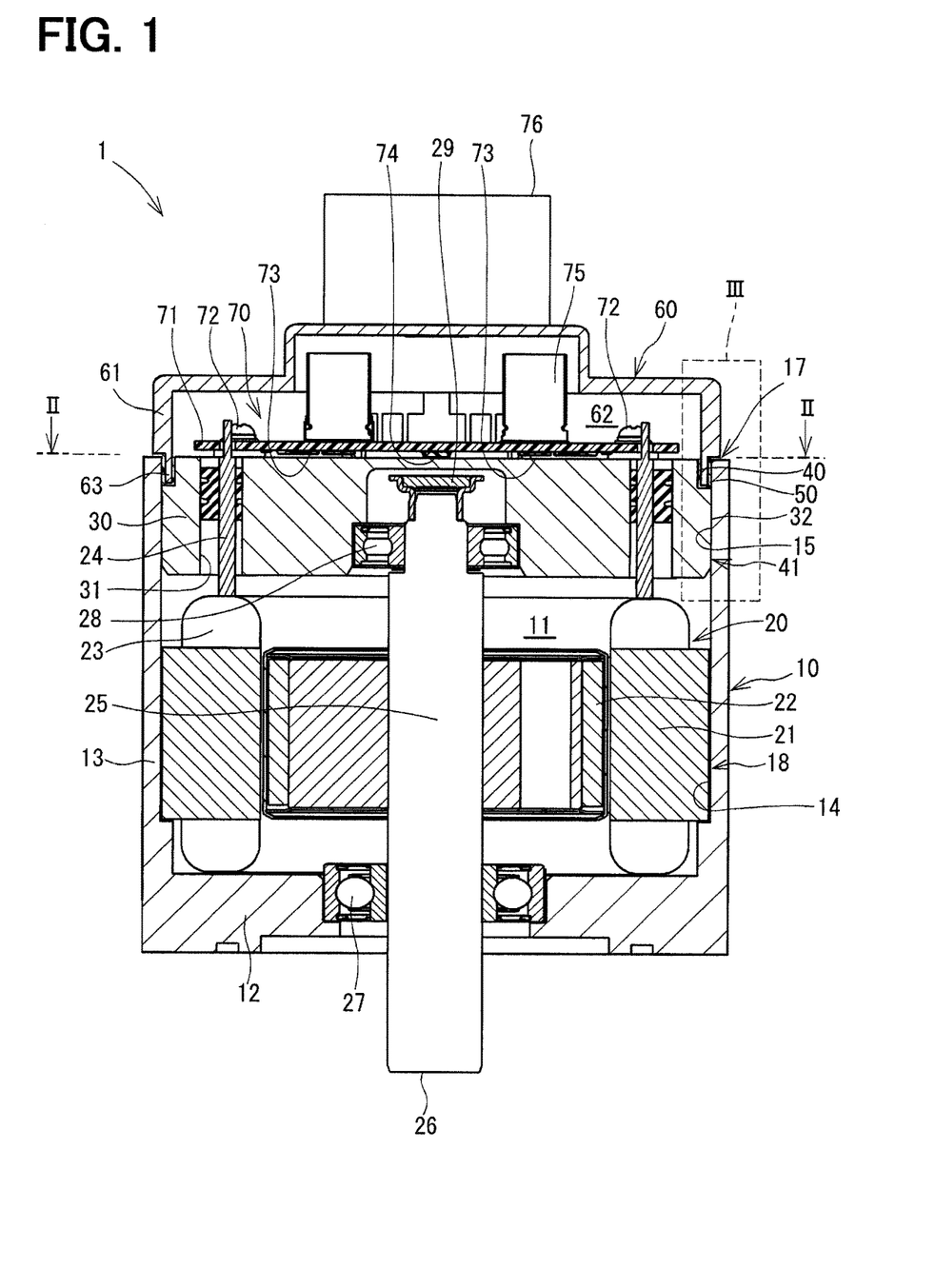
FIG. 1 is a cross-sectional view of a drive apparatus according to a first embodiment of the present invention.

As shown in FIG. 1, the drive apparatus 1 includes a motor case 10, a motor unit 20, a frame 30, a cutout 40, a seal material 50, a cover 60 and a control device 70. The motor case 10 is made of metal, such as aluminum, and is shaped into a tubular form having a bottom. Specifically, the motor case 10 includes a bottom portion 12 and a tubular portion 13. The motor case 10 has a first space 11 that receives the motor unit 20.

The motor unit 20 includes a stator 21 and a rotor 22 and is received in the first space 11 of the motor case 10. The stator 21 is shaped into a cylindrical tubular form and is press fitted to an inner peripheral wall (or simply referred to an inner wall) 14 of the tubular portion 13 of the motor case 10. Coils 23 are wound around slots formed in the stator 21. Motor lines (also referred to as motor wires) 24, which extend from the coils 23, respectively, extend through holes 31 of the frame 30 and are connected to a circuit board 71 of the control device 70.

The rotor 22 is placed on a radially inner side of the stator 21 such that the rotor 22 is rotatable relative to the stator 21. A shaft 25 is fixed to a center of the rotor 22. An output end 26 side portion of the shaft 25 is rotatably supported by a bearing 27 installed in the bottom portion 12 of the motor case 10, and another end side portion of the shaft 25, which is opposite from the output end 26, is rotatably supported by a bearing 28 that is installed to the frame 30.

When an electric power is supplied to the coils 23 through the motor lines 24, the rotor 22 and the shaft 25 of the motor unit 20 are rotated about a rotational axis thereof by a rotating magnetic field generated from the stator 21.

The frame 30 is made of metal, such as aluminum, and is fixed to the inside of the motor case 10. An outer peripheral wall 32 of the frame 30, which is located at a radially outer side of the frame 30, and an inner peripheral wall 15 of the motor case 10, which is located at a radially inner side of the motor case 10, continuously contact with each other along an entire circumferential extent thereof. The frame 30 is press fitted to the motor case 10 at a contact location 41, at which the motor case 10 and the frame 30 contact with each other. The contact location 41, at which the frame 30 is press fitted to the motor case 10, and a contact location 18, at which the stator 21 is press fitted to the motor case 10, overlap with each other in the axial direction. In this way, the inner peripheral wall of the motor case 10, along which these two locations 41, 18 are present, can be processed at once by a cutting process.

It is desirable that a material of the frame 30 and a material of the motor case 10 have an identical thermal expansion coefficient. In the present embodiment, the frame 30 and the motor case 10 are both made of the same material (the metal, such as the aluminum), so that the frame 30 and the motor case 10 have the identical thermal expansion coefficient.

Figure 2:
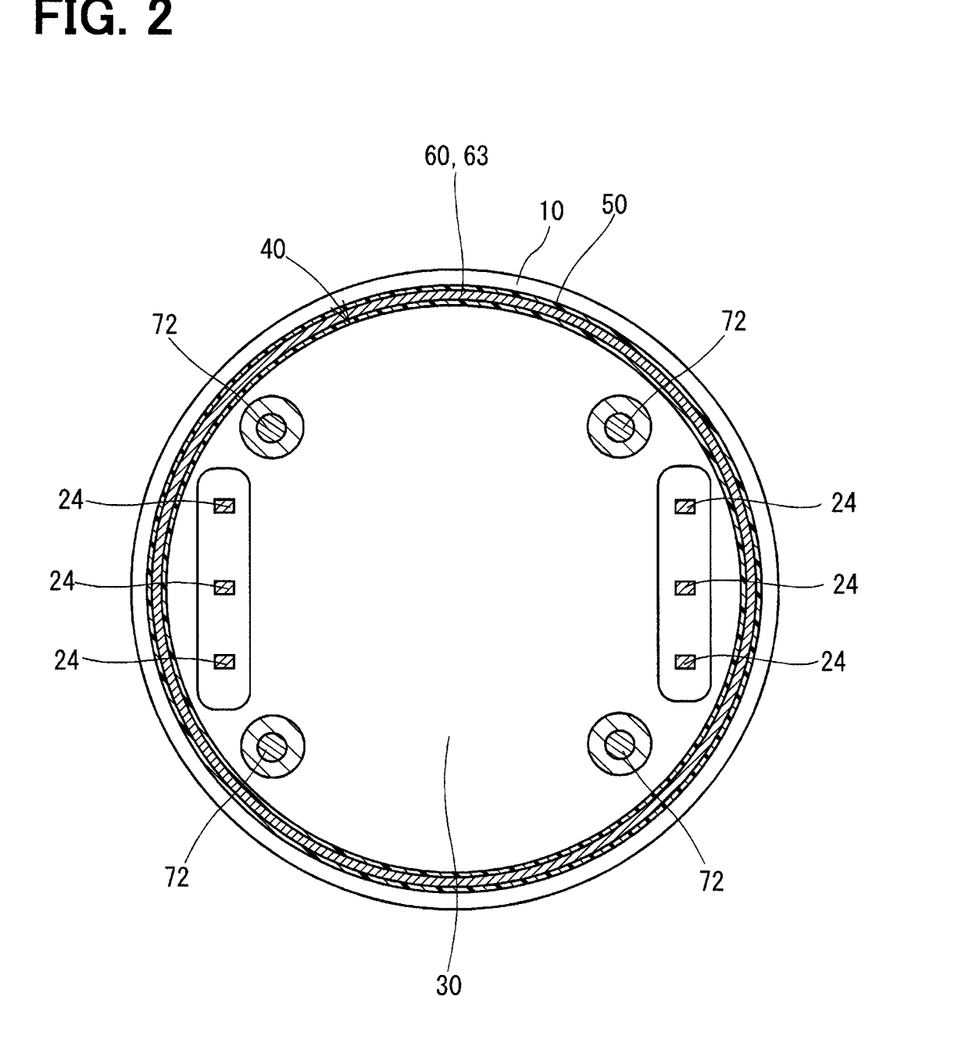
FIG. 2 is a cross-sectional view taken along line II-II in FIG. 1.
Figure 3:
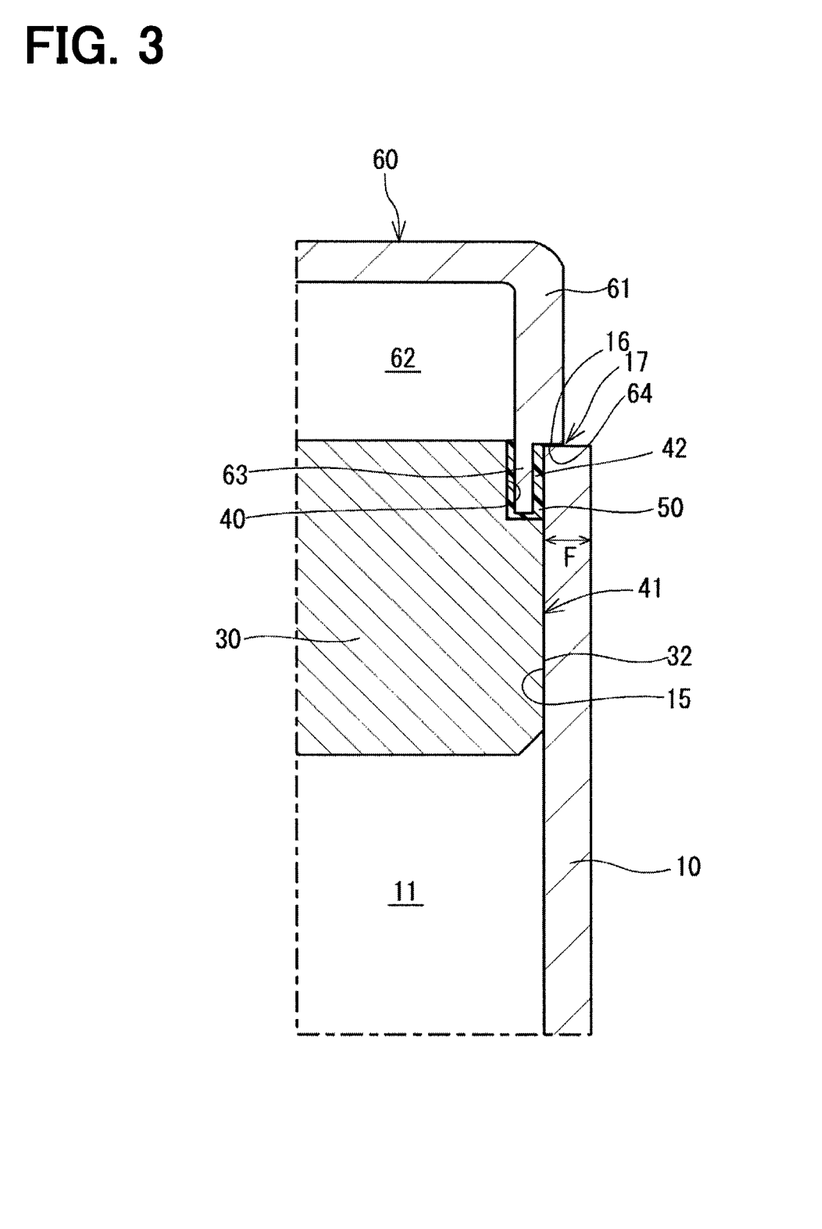
FIG. 3 is a partial enlarged view of an area III in FIG. 1.

In the first embodiment, as shown in FIGS. 2 and 3, the cutout 40, which extends in the circumferential direction, is formed in the outer peripheral wall 32 of the frame 30. The cutout 40 is located on an opposite side of the contact location 41, which is opposite from the first space 11. The cutout 40 forms a seal groove 42, which extends in the circumferential direction all around the opening of the motor case 10 between the motor case 10 and the frame 30.

A seal material 50 is received in the seal groove 42. The seal material 50 of the present embodiment is, for example, a bonding agent that is filled in the seal groove 42 in a liquid state and is then solidified (i.e., cured). The outer peripheral wall 32 of the frame 30 is press fitted to the inner peripheral wall 15 of the motor case 10 at the contact location 41. Therefore, at the time of filling the seal material 50 in the liquid state into the seal groove 42, it is possible to limit leakage of the seal material 50 to the first space 11 through the contact location 41 between the outer peripheral wall 32 of the frame 30 and the inner peripheral wall 15 of the motor case 10.

The seal groove 42 is covered with the cover 60. The cover 60 includes a cover main body 61 and an inserting portion 63. The cover main body 61 is shaped into a tubular form having a bottom. The inserting portion 63 projects from the cover main body 61 toward the seal groove 42 side and is shaped into a tubular form (also referred to as a ring form). The cover main body 61 forms a second space 62 in an inside of the cover main body 61. The second space 62 is formed on an opposite side of the frame 30, which is opposite from the first space 11, in the direction of the rotational axis of the shaft 25.

The inserting portion 63 is inserted into the seal groove 42. In this way, a contact surface area between the seal material 50 and the inserting portion 63 is increased. Furthermore, when the inserting portion 63 is inserted into the seal groove 42 in the state where the seal material 50 is in the liquid state, the seal material 50 is pressurized by the inserting portion 63 and thereby tightly contacts an inner wall of the seal groove 42 and the inserting portion 63. Therefore, when the seal material 50 is solidified, the cover 60, the frame 30 and the motor case 10 are reliably bonded together by the seal material 50.

A radial wall thickness (also referred to as a plate thickness) of the inserting portion 63 is smaller than a radial wall thickness (also referred to as a plate thickness) of the cover main body 61. Therefore, a step surface 64 is formed between the cover main body 61 and the inserting portion 63. The step surface 64 contacts an opening side end surface 16 of the motor case 10. In this way, an axial position of the cover 60 relative to the opening side end surface 16 of the motor case 10 is defined.

A portion of the seal material 50 filled in the seal groove 42 enters an area between the step surface 64 of the cover 60 and the opening side end surface 16 of the motor case 10. The seal material 50 limits intrusion of liquid, such as water, from an outside of the motor case 10 and the cover 60 into the first space 11 and the second space 62. Specifically, the seal material 50 limits intrusion of the water or the like from a contact location 17 between the motor case 10 and the cover 60 into the seal groove 42 and further limits intrusion of the water or the like into the first space 11 and the second space 62 through the seal groove 42.

In this way, the drive apparatus 1 can limit intrusion of the water or the like into the first space 11 and the second space 62 by the seal material 50, which is provided in the single seal groove 42. As shown in FIG. 1, the control device 70, which is installed in the second space 62, controls the motor unit 20 through an electronic circuit formed in the circuit board 71. The circuit board 71 is fixed to the frame 30 through screws 72.

Switching devices 73, a position sensor 74 and an undepicted microcomputer are installed to the frame 30 side of the circuit board 71. A capacitor 75 and an undepicted choke coil are installed on the opposite side of the circuit board 71, which is opposite from the frame 30.

An electric power for driving the motor unit 20 and signals with respect to the steering assist torque are inputted to the electronic circuit of the circuit board 71 through a connector 76. The motor lines 24, which extend from the coils 23 of the motor unit 20, are connected to circuit lines of the electronic circuit formed on the circuit board 71.

The switching devices 73 include switching devices, which form a three-phase inverter circuit for supplying the electric power to the motor unit 20, and switching devices, which function as power relays. The position sensor 74 senses a magnetic field of a magnet 29, which is installed to a distal end part of the shaft 25 of the motor unit 20. The microcomputer turns on or off the switching devices 73 based on a position of the rotor 22, which is sensed based on an output signal of the position sensor 74, and the amount of electric current, which is required to implement the steering assist torque, to control the supply of the electric power from the inverter circuit to the coils 23.

The capacitor 75 and the choke coil form a filter circuit. The filter circuit reduces noises transmitted from other devices, which share a battery with the drive apparatus 1, to the drive apparatus 1. The filter circuit also reduces noises transmitted from the drive apparatus 1 to other devices, which share the battery with the drive apparatus 1.

Figure 9:
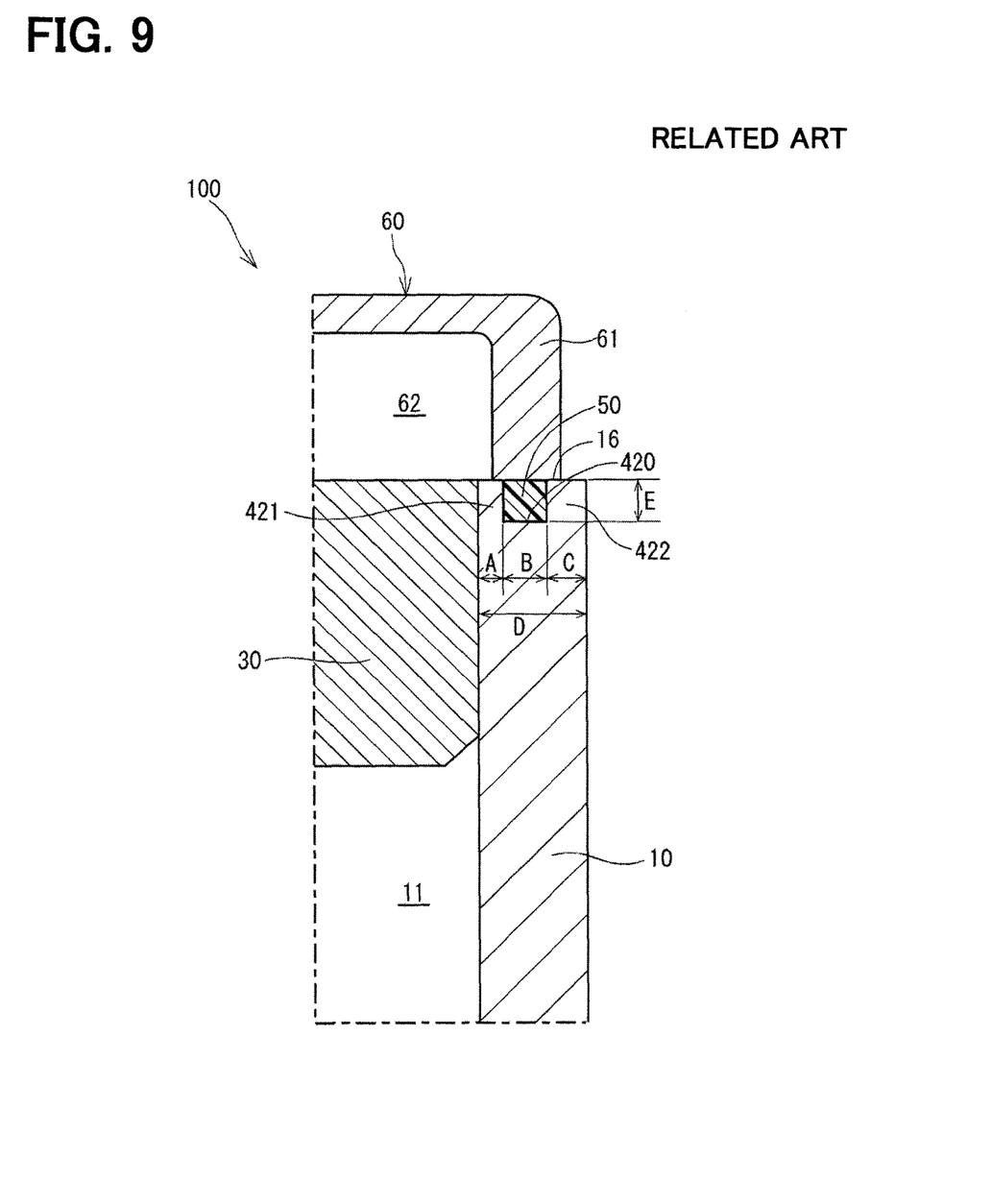
FIG. 9 is a partial enlarged view that is similar to FIG. 3 and shows a drive apparatus of a comparative example.

Now, a drive apparatus 100 of a comparative example will be described with reference to FIG. 9.

In the drive apparatus 100 of the comparative example, a seal groove 420, which extends in a circumferential direction all around the opening of the motor case 10, is formed in the opening side end surface 16 of the motor case 10. The seal material 50 is filled in the seal groove 420. The cover 60 covers the seal groove 420. In this way, the drive apparatus 100 of the comparative example limits intrusion of the liquid, such as the water, from the outside of the motor case 10 and the cover 60 into the first space 11 and the second space 62.

In the drive apparatus 100 of the comparative example, a radial width B of the seal groove 420, a radial width A of an inner peripheral wall 421, which is formed on a radially inner side of the seal groove 420, and a radial width C of an outer peripheral wall 422, which is formed on a radially outer side of the seal groove 420, result in that a radial wall thickness (also referred to as a plate thickness) D of the motor case 10 becomes thick. Therefore, a radial size of the drive apparatus 100 of the comparative example is disadvantageously increased.

Furthermore, in a case where an axial depth E of the seal groove 420 is increased in the drive apparatus 100 of the comparative example, the seal groove 420 may be formed at the opening side end surface 16 of the motor case 10 with an end mill in an end milling process. However, when the end milling process is executed, the manufacturing steps of the motor case 10 may possibly be complicated.

The drive apparatus 1 of the first embodiment provides the following advantages over the drive apparatus 100 of the comparative example.

(1) In the first embodiment, the seal groove 42, which extends in the circumferential direction, is formed between the motor case 10 and the frame 30 by forming the cutout 40 in the outer peripheral wall of the frame 30, which is located at the radially outer side of the frame 30. The seal material 50, which is received in the single seal groove 42, can limit intrusion of the liquid, such as the water, from the outside of the motor case 10 and the cover 60 into the first space 11 and the second space 62, which are partitioned by the frame 30.

Furthermore, when the seal groove 42 is formed with the cutout 40 of the frame 30 and the inner peripheral wall of the motor case 10, a radial wall thickness F (see FIG. 3) of the motor case 10 can be reduced in comparison to the radial wall thickness D of the motor case 10 of the comparative example, in which the seal groove 420 is formed in the opening side end surface 16 of the motor case. Thereby, the radial size of the drive apparatus 1 can be reduced according to the present embodiment.

(2) In the first embodiment, the seal material 50 limits intrusion of the water or the like from the contact location 17 between the motor case 10 and the cover 60 into the seal groove 42 and also limits intrusion of the water or the like from the seal groove 42 into the first space 11 and the second space 62.

In this way, the seal material 50 can reliably limit intrusion of, for example, the water into the first space 11 and the second space 62.

(3) In the first embodiment, the frame 30 is press fitted to the motor case 10 at the contact location 41.

Thereby, at the time of filling the seal material 50, which is in the liquid state, into the seal groove 42, it is possible to limit the leakage of the seal material 50 from the contact location 41 between the motor case 10 and the frame 30 to the first space 11.

(4) In the first embodiment, the cutout 40 is formed in the outer peripheral wall of the frame 30, which is located at the radially outer side of the frame 30. In this way, the radial wall thickness F of the motor case 10 can be reduced in comparison to a case where the cutout 43 is formed in the inner peripheral wall of the motor case 10, which is located at the radially inner side of the motor case 10 (see FIG. 4).

(5) In the first embodiment, the cover 60 includes the inserting portion 63, which is inserted into the cutout 40.

Thereby, the cover 60, the frame 30 and the motor case 10 can be reliably bonded together with the seal material 50.

Furthermore, when the inserting portion 63 is inserted into the seal groove 42 in the state where the seal material 50 is in the liquid state, the seal material 50 is pressurized by the inserting portion 63 and thereby tightly contacts the inner wall of the seal groove 42 and the inserting portion 63 without forming a gap. Therefore, the drive apparatus 1 can improve the limiting effect for limiting intrusion of the liquid from the outside through use of the seal material 50.

(6) In the first embodiment, the step surface 64 of the cover 60 contacts the opening side end surface 16 of the motor case 10.

In this way, the seal material 50 can penetrate into a small gap at the contact location 17 between the cover 60 and the motor case 10. Therefore, the drive apparatus 1 can improve the limiting effect for limiting intrusion of the liquid from the outside through use of the seal material 50.

Furthermore, a height of the cover 60 measured from the opening side end surface 16 can be defined.

(7) In the first embodiment, it is desirable that the material of the motor case 10 and the material of the frame 30 have the identical thermal expansion coefficient.

In this way, in a case where the temperature of the drive apparatus 1 changes, a stress, which is applied from the inner peripheral wall 15 of the motor case 10 and the cutout 40 of the frame 30 to the seal material 50, can be reduced.

(Second Embodiment)

Figure 4:
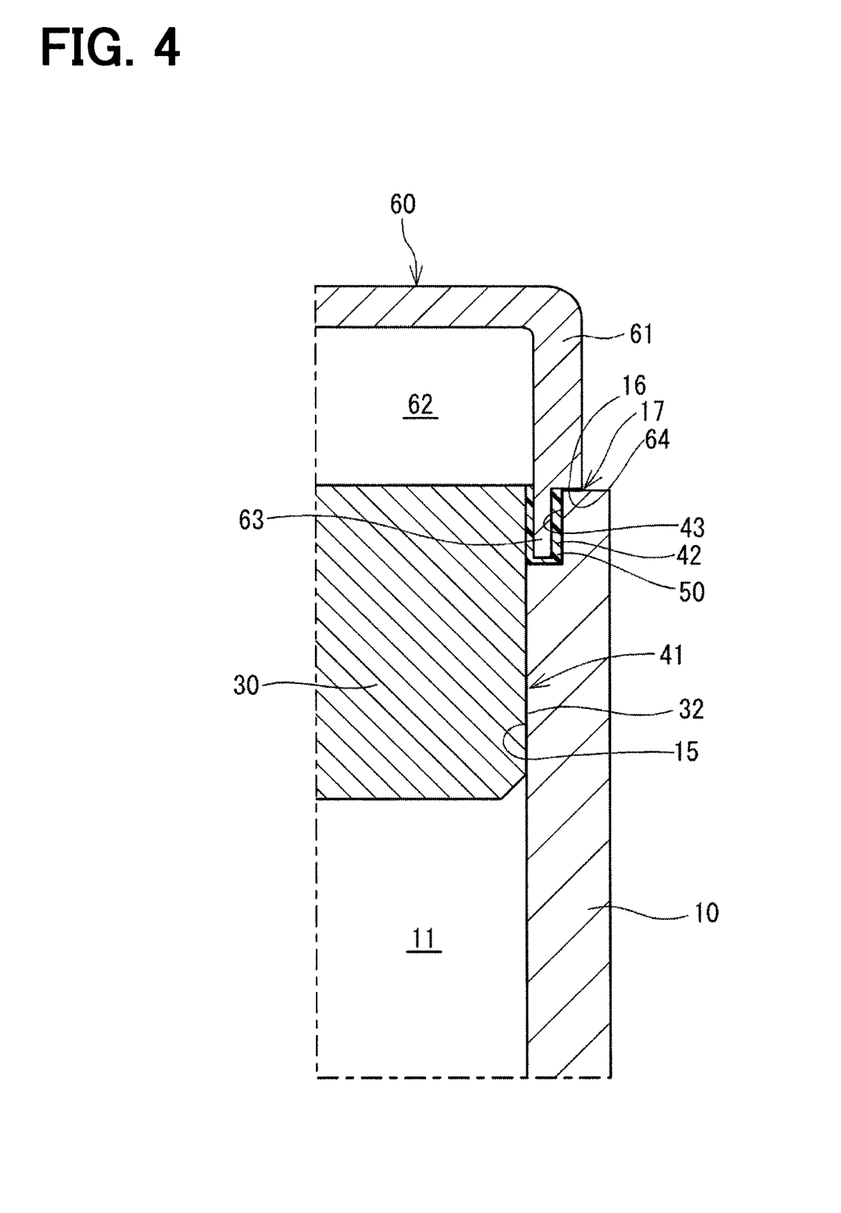
FIG. 4 is a partial enlarged view that is similar to FIG. 3 and shows a drive apparatus according to a second embodiment of the present disclosure.

FIG. 4 is a partial enlarged view of the drive apparatus 1 according to a second embodiment of the present disclosure. In the second embodiment, a cutout 43, which extends in the circumferential direction all around the opening of the motor case 10, is formed in the inner peripheral wall of the motor case 10, which is located at the radially inner side of the motor case 10. The cutout 43 forms the seal groove 42, which extends in the circumferential direction all around the opening of the motor case 10 between the motor case 10 and the frame 30.

A seal material 50 is received in the seal groove 42. In this way, the drive apparatus 1 can limit intrusion of, for example, the water into the first space 11 and the second space 62 by the seal material 50, which is provided in the single seal groove 42.

In the second embodiment, the cutout 43 is formed in the inner peripheral wall of the motor case 10, which is located at the radially inner side of the motor case 10, so that a radial size of the second space 62 can be increased in comparison to that of the first embodiment.

(Third Embodiment)

Figure 5:
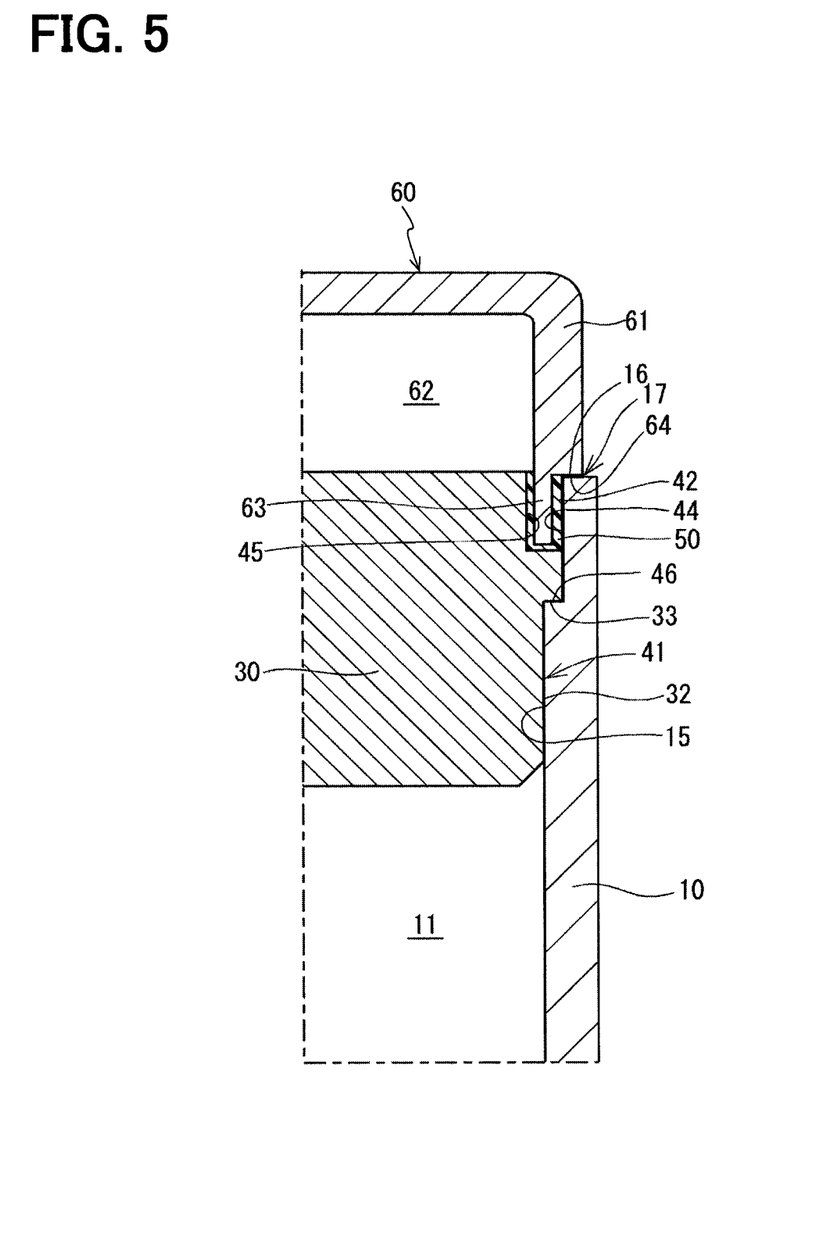
FIG. 5 is a partial enlarged view that is similar to FIG. 3 and shows a drive apparatus according to a third embodiment of the present disclosure.

FIG. 5 is a partial enlarged view of the drive apparatus 1 according to a third embodiment of the present disclosure. In the third embodiment, a first cutout 44 is formed in the inner peripheral wall of the motor case 10, which is located at the radially inner side of the motor case 10, and a second cutout 45 is formed in the outer peripheral wall of the frame 30, which is located at the radially outer side of the frame 30. In the third embodiment, the seal groove 42, which extends in the circumferential direction all around the opening of the motor case 10 between the motor case 10 and the frame 30, is formed by the first cutout 44 and the second cutout 45.

The first cutout 44, which is formed in the motor case 10, axially extends toward the first space 11 beyond the second cutout 45, which is formed in the frame 30. A step 33 is formed in the frame 30 to correspond with an axial end surface 46 of the first cutout 44 of the motor case 10. The axial end surface 46 of the first cutout 44 of the motor case 10 and the step 33 of the frame 30 contact with each other, so that an axial position of the frame 30 is defined.

According to the third embodiment, the radial wall thickness of the motor case 10 can be reduced in comparison to the radial wall thickness of the motor case 10 of the second embodiment. Furthermore, the axial position of the frame 30 can be defined by the first cutout 44.

(Fourth Embodiment)

Figure 6:
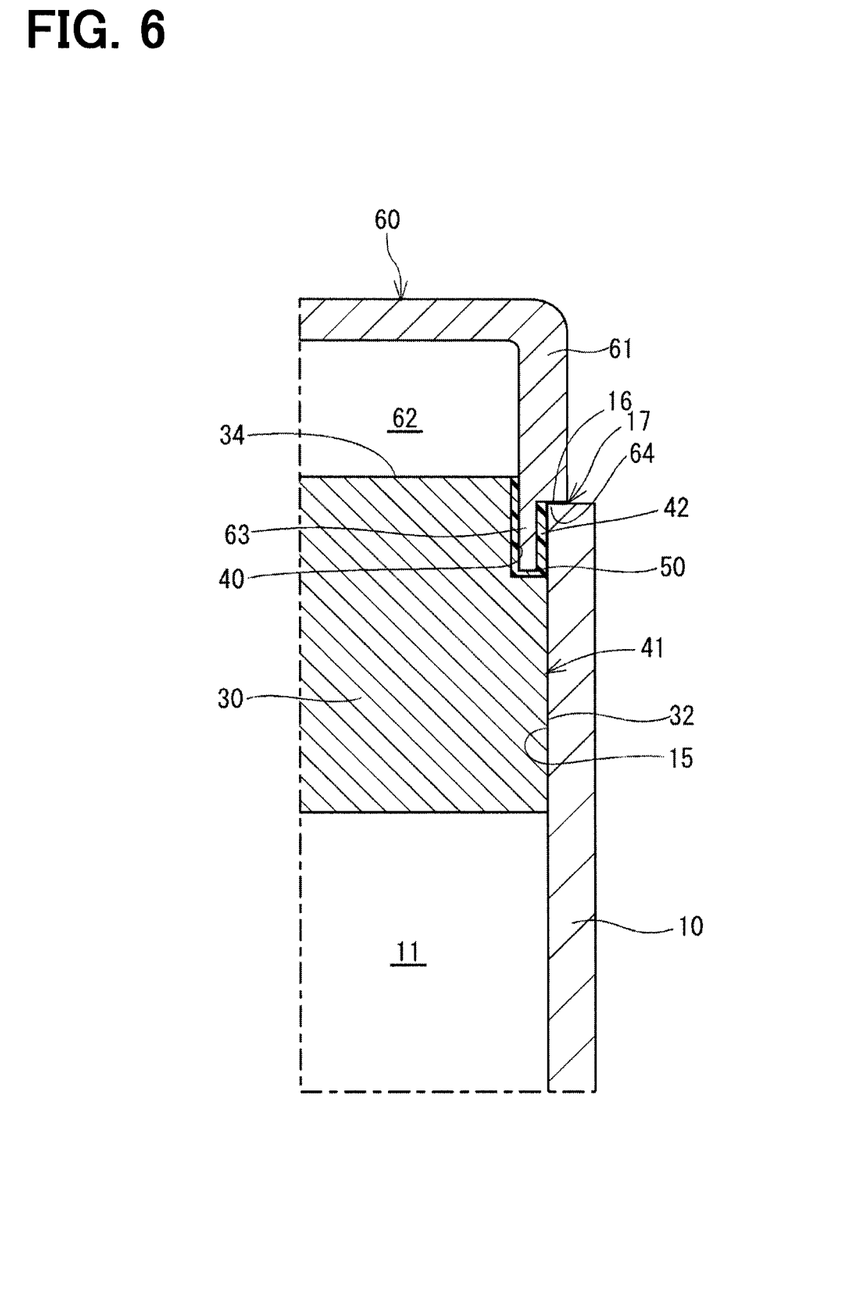
FIG. 6 is a partial enlarged view that is similar to FIG. 3 and shows a drive apparatus according to a fourth embodiment of the present disclosure.

FIG. 6 is a partial enlarged view of the drive apparatus 1 according to a fourth embodiment of the present disclosure. According to the fourth embodiment, the second space 62 side surface 34 of the frame 30 is further spaced from the first space 11 in comparison to the opening side end surface 16 of the motor case 10. In this way, at the time of inserting the inserting portion 63 of the cover 60 into the seal groove 42 in the state where the seal material 50, which is filled into the cutout 40, is in the liquid state, it is possible to limit leakage of the seal material 50 into the second space 62. Therefore, according to the fourth embodiment, it is possible to limit adhesion of the seal material 50 to the electronic components placed in the second space 62.

(Fifth Embodiment)

Figure 7:
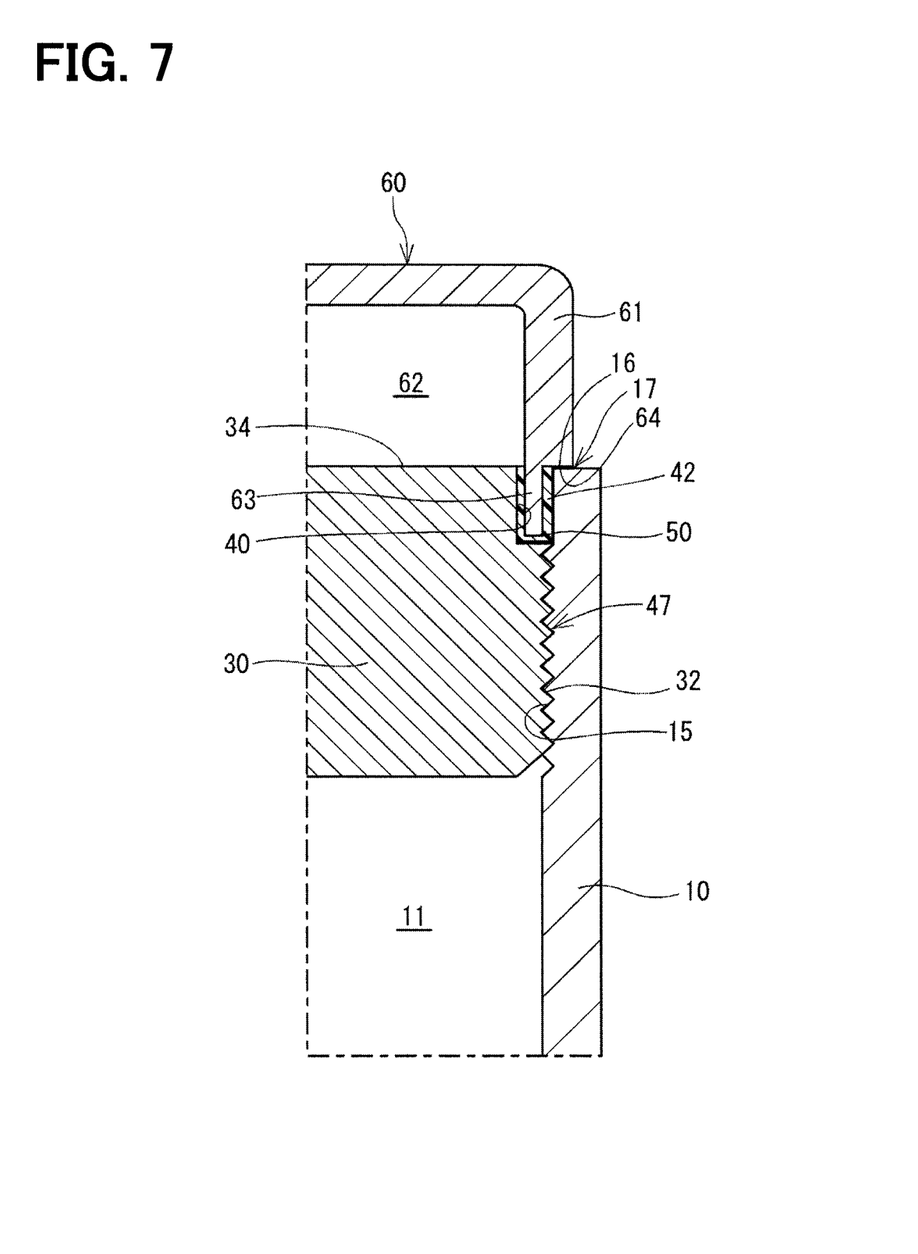
FIG. 7 is a partial enlarged view that is similar to FIG. 3 and shows a drive apparatus according to fifth embodiment of the present disclosure.

FIG. 7 is a partial enlarged view of the drive apparatus 1 according to a fifth embodiment of the present disclosure. According to the fifth embodiment, the motor case 10 and the frame 30 are fixed together with threads 47 (specifically, a male thread of the frame 30 and a female thread of the motor case 10) at the contact location 41 between the motor case 10 and the frame 30. It is desirable that an inner diameter of the female thread, which is formed in the inner peripheral wall 15 of the motor case 10, is larger than an inner diameter of the inner peripheral wall 14 of the motor case 10, against which the stator 21 is press fitted, at the contact location 18 (see FIG. 1) in terms of the installation of the stator 21. Even in the fifth embodiment, the advantages, which are similar to those of the first to fourth embodiments, can be achieved.

(Sixth Embodiment)

Figure 8:
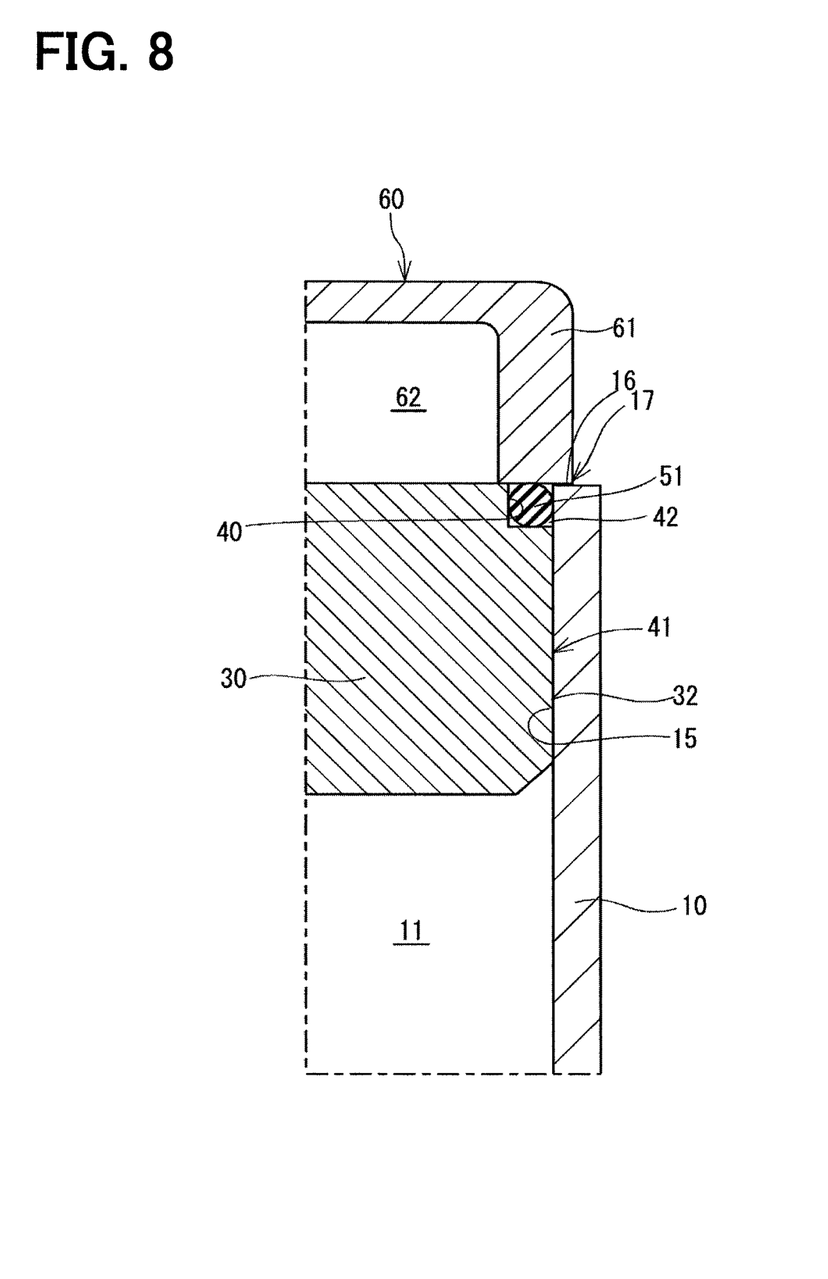
FIG. 8 is a partial enlarged view that is similar to FIG. 3 and shows a drive apparatus according to a sixth embodiment of the present disclosure.

FIG. 8 is a partial enlarged view of the drive apparatus 1 according to a sixth embodiment of the present disclosure. In the sixth embodiment, the seal material, which is received in the seal groove 42, is an O-ring 51, which is shaped into an annular form and is made of, for example, rubber or elastomer. In a pre-installation state of the O-ring 51, which is before the installation of the O-ring 51 into the seal groove 42, an outer diameter of a cross section of the O-ring 51 is larger than each of a radial extent and an axial extent of the seal groove 42. In the sixth embodiment, the inserting portion 63 is not formed in the cover 60. The cover 60 presses the O-ring 51 and contacts the opening side end surface 16 of the motor case 10 or the second space 62 side surface 34 of the frame 30. In this way, the O-ring 51 is received in the seal groove 42 in the compressed state thereof.

Even in the sixth embodiment, similar to the first to fourth embodiments, the O-ring 51, which serves as the seal material, can limit intrusion of the liquid, such as the water, from the outside of the motor case 10 and the cover 60 into the first space 11 and the second space 62.

(Other Embodiments)

(1) In the above embodiments, the drive apparatus 1 used in, for example, the electric power steering apparatus of the vehicle has been described. Alternatively, in another embodiment, the drive apparatus 1 of the present disclosure may be used in various other types of apparatuses, such as an automatic wiper apparatus or a power window apparatus.

(2) In the above embodiments, a brushless motor is used as an example of the motor unit 20 of the drive apparatus 1. Alternatively, in another embodiment, the motor unit 20 of the drive apparatus 1 may be any other types of motor, such as a brushed motor.

The present disclosure is not limited to the above embodiments. That is, the above embodiments may be further modified in various ways without departing from the principle of the present disclosure.

What is claimed is:

1. A drive apparatus comprising:
   a motor unit;
   a motor case that is shaped into a tubular form and has a first space, which receives the motor unit;
   a frame that contacts an inner peripheral wall of the motor case at a contact location and is fixed to an inside of the motor case;
   at least one cutout that is formed in at least one of the inner peripheral wall of the motor case and an outer peripheral wall of the frame and is located on an opposite side of the contact location, which is opposite from the first space, wherein the at least one cutout forms a seal groove, which is located between the motor case and the frame and extends in a circumferential direction;
   a cover that covers the seal groove and forms a second space on an opposite side of the frame, which is opposite from the first space; and
   a seal material that is received in the seal groove and contacts each of the motor case, the frame and the cover in a radial direction relative to an axis of the motor unit, wherein:
   the cover includes an inserting portion that is inserted into an inside of the at least one cutout and inserted into the seal material, and
   the seal material includes one portion, which seals between the inserting portion and the frame, and another portion, which seals between the inserting portion and the motor case.

2. The drive apparatus according to claim 1, wherein the motor case contacts the cover.

3. The drive apparatus according to claim 1, wherein the frame is press fitted to the motor case at the contact location.

4. The drive apparatus according to claim 1, wherein the at least one cutout includes a cutout, which is formed in the outer peripheral wall of the frame.

5. The drive apparatus according to claim 1, wherein the at least one cutout includes a cutout, which is formed in the inner peripheral wall of the motor case.

6. The drive apparatus according to claim 1, wherein the at least one cutout includes:
   a cutout, which is formed in the outer peripheral wall of the frame; and
   a cutout, which is formed in the inner peripheral wall of the motor case.

7. The drive apparatus according to claim 1, wherein the cover includes
   a cover main body that is shaped into a tubular form having a bottom, and
   the inserting portion projects from the cover main body and is shaped into a tubular form.

8. The drive apparatus according to claim 7, wherein:
   a radial wall thickness of the inserting portion is smaller than a radial wall thickness of the cover main body; and a step surface, which is formed at a connection between the cover main body and the inserting portion, contacts an opening side end surface of the motor case.

9. The drive apparatus according to claim 1, further comprising a control device, which controls the motor unit and is placed in the second space.

10. The drive apparatus according to claim 1, wherein a material of the motor case and a material of the frame have an identical thermal expansion coefficient.

11. The drive apparatus according to claim 1, wherein the frame does not contact the motor case on an opposite side of the seal groove, which is opposite from the first space in an axial direction of the motor unit.

12. The drive apparatus according to claim 1, wherein the seal material is placed between the motor case and the frame in the radial direction relative to an axis of the motor unit.

13. The drive apparatus according to claim 1, wherein the seal groove axially extends from an axial end of the at least one of the inner peripheral wall of the motor case and the outer peripheral wall of the frame, which is opposite from the first space in an axial direction of the motor unit.

14. The drive apparatus according to claim 1, wherein the seal material is bonded to the frame.

15. The drive apparatus according to claim 1, wherein the seal material is an elastomer.

16. The drive apparatus according to claim 1, wherein the seal material seals a junction at which the motor case, the frame and the cover are joined.

17. The drive apparatus according to claim 1, wherein:
the one portion of the seal material is held between the inserting portion and the frame in the radial direction;
the another portion of the seal material is held between the inserting portion and the motor case in the radial direction; and
the one portion of the seal material and the another portion of the seal material are radially joined with each other through a radial portion of the seal material that extends from the one portion of the seal material to the another portion of the seal material in the radial direction.

* * * * *